(No Model.)  
4 Sheets—Sheet 3.
C. JOHNSEN.
DIVIDERS.
No. 280,831.  Patented July 10, 1883.
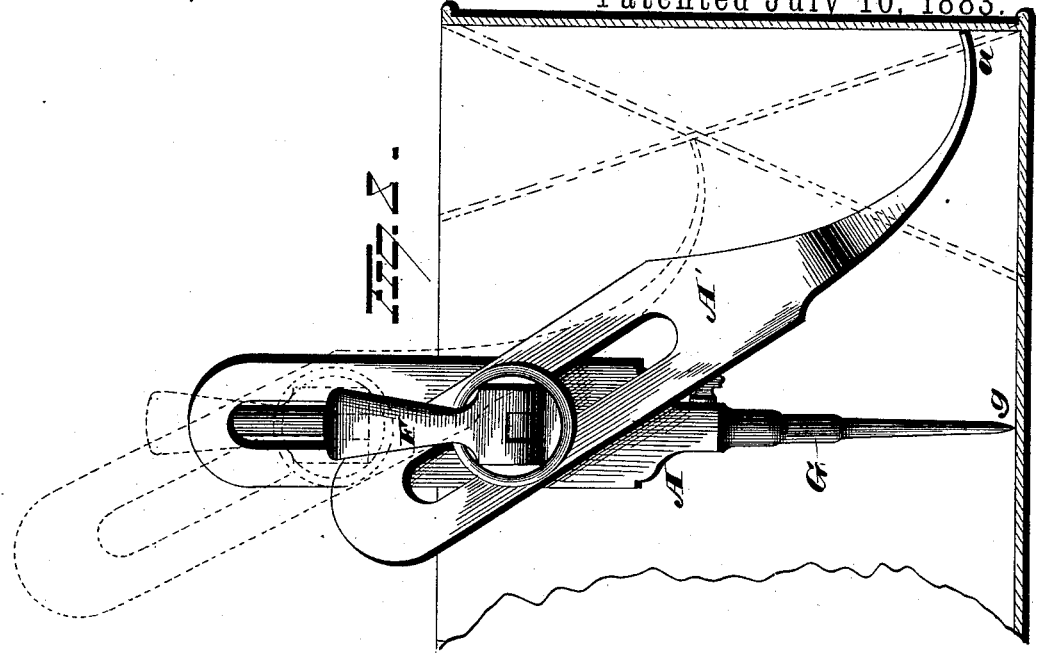
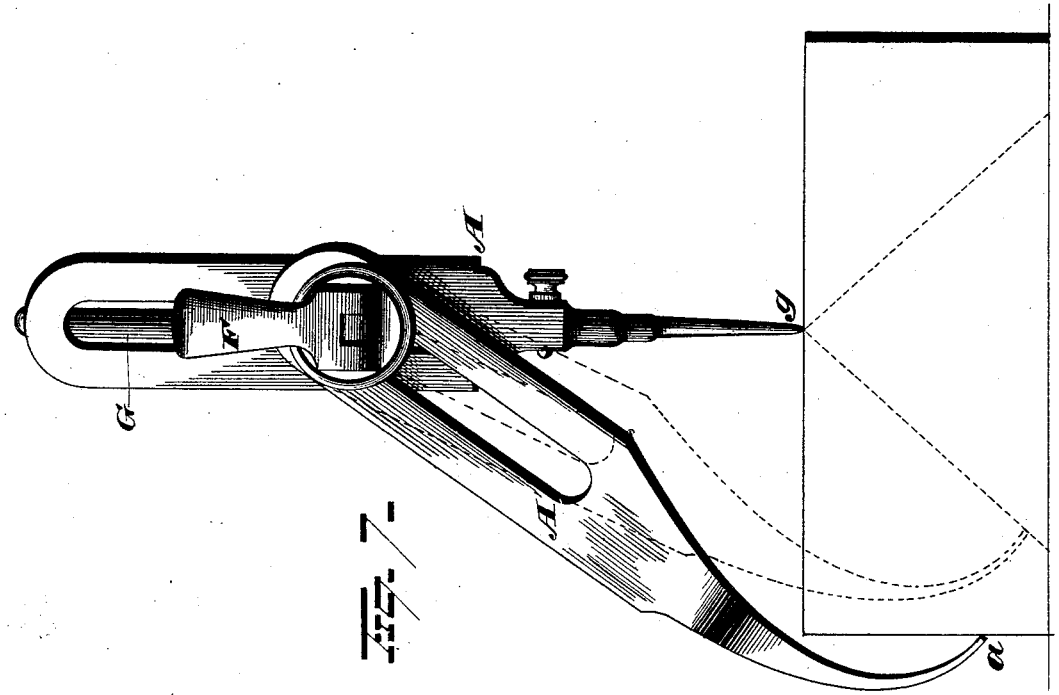
WITNESSES  
D. Nottingham  
Geo. F. Downing
INVENTOR  
Carl Johnsen  
By Suggett & Suggett  
Attorneys (No Model.) 4 Sheets—Sheet 4.
C. JOHNSEN.
DIVIDERS.
No. 280,831. Patented July 10, 1883.
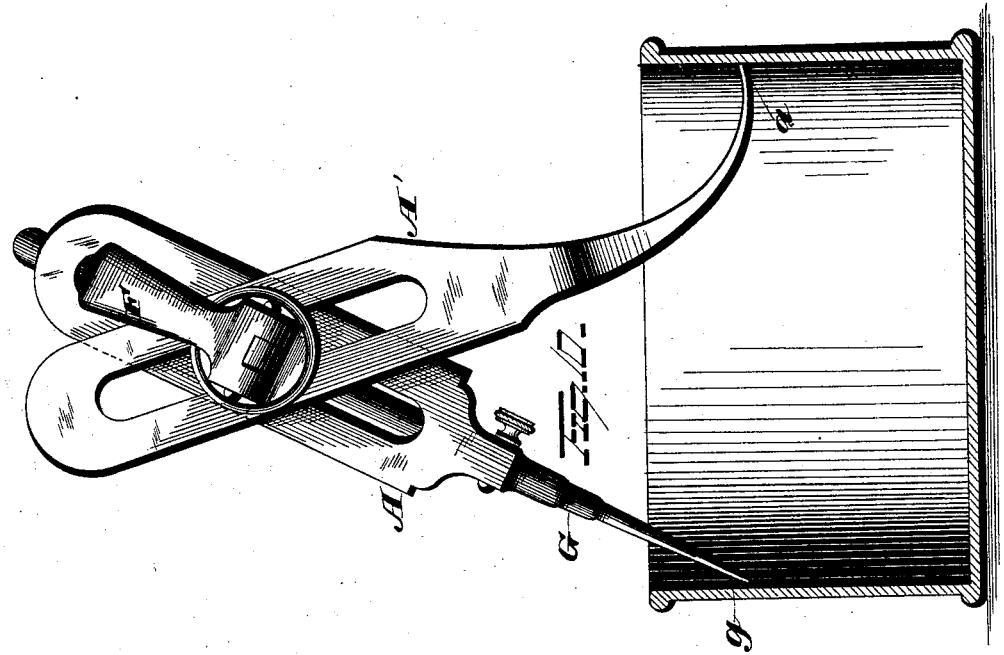
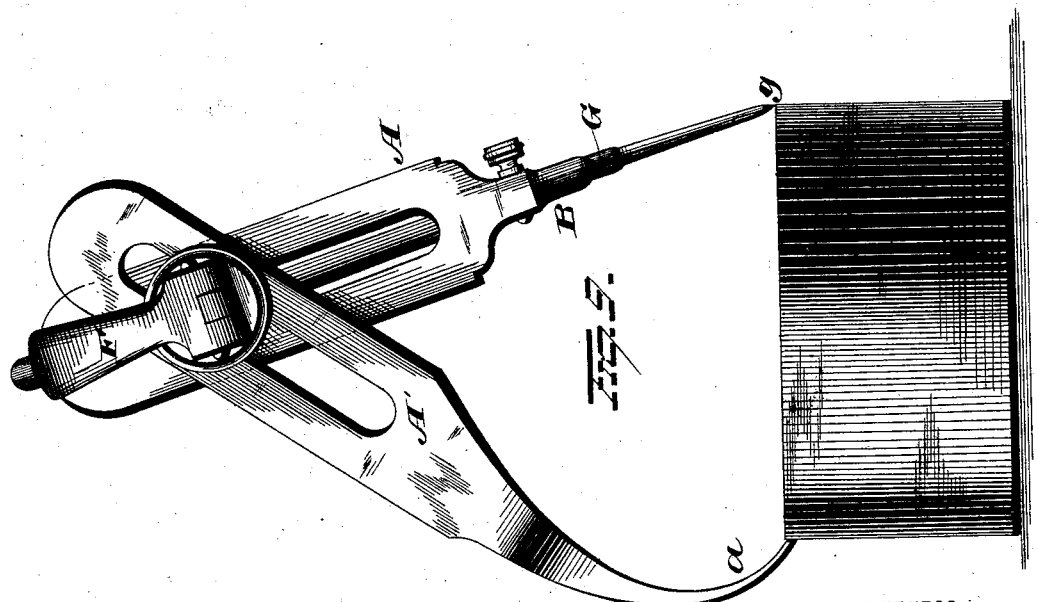
WITNESSES
R. J. Nottingham
Geo. F. Downing
INVENTOR
Carl Johnsen,
By Leggett & Leggett,
Attorneys.

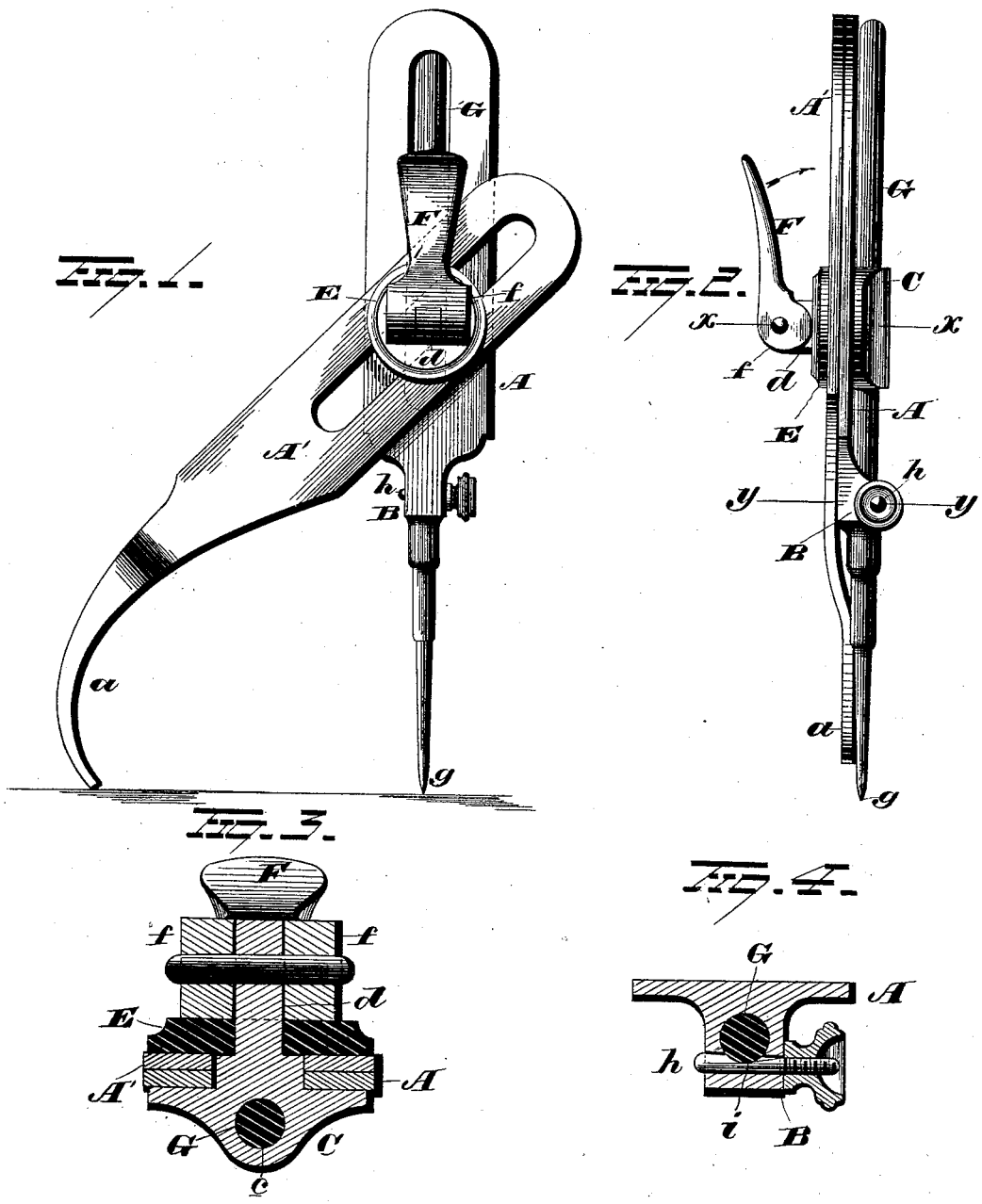

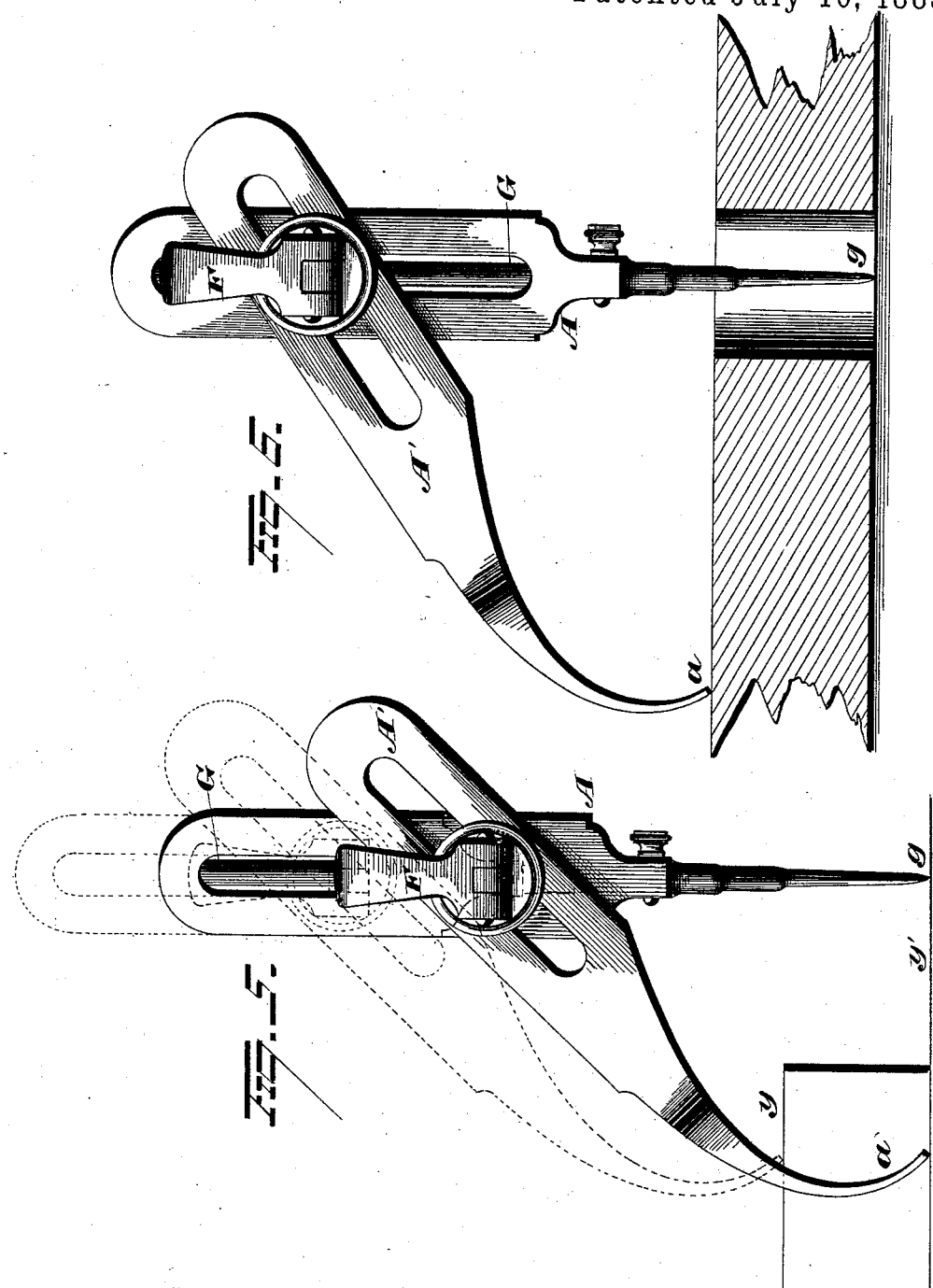

UNITED STATES PATENT OFFICE.

CARL JOHNSEN, OF CHRISTIANIA, NORWAY.

DIVIDERS.

SPECIFICATION forming part of Letters Patent No. 280,831, dated July 10, 1883.

Application filed October 18, 1882. (No model.)

*To all whom it may concern:*

Be it known that I, CARL JOHNSEN, of Christiania, in the Kingdom of Norway, have invented certain new and useful Improvements in Dividers; and I do hereby declare the following to be a full, clear, and exact description of the invention, such as will enable others skilled in the art to which it pertains to make and use it, reference being had to the accompanying drawings, which form part of this specification.

The object of this invention is to provide a readily-adjustable instrument which may be used for describing circles or arcs upon either flat or irregular surfaces, upon surfaces in different planes about a common center, around either outer or inner peripheral surfaces of cylindrical or tapering bodies, or upon a surface in a plane about a center-point in a different plane, said instrument being also adapted for use as either inside or outside calipers, and as a center-seeker and dividers.

The invention consists in certain novel constructions and combinations of devices, which will be hereinafter fully described with reference to the accompanying drawings, in which—

Figure 1 is a front view of my improved instrument used as a compass for describing circles or arcs upon a flat surface. Fig. 2 is a view edgewise of the arms. Fig. 3 is a section on the line *x x* of Fig. 2. Fig. 4 is a section on the line *y y* of Fig. 2. Fig. 5 is a view of the instrument as used for describing circles or arcs in different planes about a center.
Fig. 6 shows the instrument adjusted for describing a circle upon a flat surface about a center-point in a different plane. Fig. 7 illustrates the use of the instrument for describing circles or arcs upon exterior peripheral surfaces. Fig. 8 shows the manner of using the instrument for describing lines around inner peripheral surfaces. Fig. 9 illustrates the use of the instrument as outside calipers, and Fig. 10 shows the same applied to use as inside calipers.

The letter A designates an ablong flat arm having a longitudinal slot throughout nearly its whole length. Said arm terminates at one end in a sleeve, B, which has its axis in a line parallel with the arm and at one side thereof.

A' is a similar arm lying flat against the arm A, and terminating in a curved finger, *a*.

C is a clamp-head, which is flat against the surface of the arm A, on the same side with the sleeve B, and has through it a passage, *c*, of the same diameter as and coinciding with the bore of said sleeve.

From the clamp-head a stud, *d*, extends through the slots of both the arms and projects beyond the outer surface of arm A', its projecting portion passing loosely through a clamping-plate, E, arranged to bear against the surface of said arm. The portion of the stud which projects beyond the clamping-plate E is flattened at its sides, and is pivoted eccentrically in a notch formed in the cylindrical head *f* of a clamping-lever, F, the parts of the said head on each side of the stud being arranged to bear against the clamping-plate E when the lever is turned toward the arm A' in the direction indicated by the arrow in Fig. 2. It will be observed that when the said lever is so turned and its head bears against the clamping-plate the clamp-head C will be drawn by the stud *d* against the surface of the arm A, and the two arms A and A' will be firmly clamped together between the clamping-plate and clamp-head, and said arms may thus be firmly held in any position to which they may be adjusted with respect to each other. By raising the lever F the clamping-pressure will be removed from said arms, and they may be then adjusted as desired by either sliding the stud *d* along the stop of arm A or sliding the arm A' longitudinally or turning it about the stud.

Through the sleeve B and the passage *c* in the clamp-head C is passed a rod, G, terminating in a point, *g*, which is the point upon which the instrument rests when in use as a compass. The rod G is adjustable longitudinally, and is held in place by a pin, *h*, which passes transversely through one side of the sleeve B, and is provided with a notch, *i*, to receive the rod G. The wall of this notch will impinge against the rod tightly when the pin *h* is drawn through the sleeve by means of a thumb-nut which is fitted upon a screw-threaded projecting portion of the pin for that purpose. The back or side of the pin *h* opposite the rod is seated against the wall of the aperture through which said pin passes.

It will be observed that while the pin serves to hold the rod in place the rod also will prevent the pin from escaping from its seat, as the wall of the notch will be stopped by the rod when the pin moves in either longitudinal direction.

In using the instrument as a compass for describing circles or arcs upon a flat surface, the rod G stands vertically upon its point, as shown in Fig. 1, the point of the arm A' is placed upon the surface, and said arm may be then adjusted longitudinally according to the radius of the circle or arc to be described. If it be desired to describe a circle or an arc upon surfaces in different planes, the instrument should be first adjusted, as above described, according to the radius of the arc, with the point of the rod G upon the center-point about which the arc or circle is to be struck. Then, after describing such portion of the curved line as passes across one surface, the pin $h$ is to be loosened and the arms adjusted either up or down, as shown in dotted lines in Fig. 5, to bring the point of arm A' upon the next surface.

In Fig. 5 the letters $y$ $y'$ indicate surfaces in different planes, the center-point of a circle to be described being supposed to be on surface $y'$.

In Fig. 6 the instrument is shown with its point in a depression of a flat surface—as, for instance, at the center of a hole in a plank, it being desired to describe a circle concentric with said hole.

In Fig. 7 the instrument is shown with its point at the center of one end of a shaft, and the point of arm A' adjusted to describe a line around said shaft at equal distances from its end at all points. In this figure a conical or tapering surface is indicated in dotted lines, the point $g$ standing on the apex of the cone. It will be seen that the point of arm A' can be adjusted to describe lines around the cone, and so with any other tapering surface.

In Fig. 8 the point $g$ rests upon the center of the bottom of a cylindrical chamber, and the point of the arm A' is adjusted to describe a line around the wall thereof.

By adjusting the arms upon the rod G, it will be seen that parallel lines may be described on either cylindrical or tapering surfaces.

The adjustment of the instrument for calipering both outside and inside will be readily understood from Figs. 9 and 10. When used as inside calipers, the finger of the arm A' curves outwardly, and when used for outside calipers the finger curves toward the point $g$.

The instrument may be provided with an extra rod for adjustment in the sleeve B and clamp-head, in lieu of the rod G, said extra rod having a curved instead of a straight point.

Having fully described my invention, what I claim as new, and desire to secure by Letters Patent, is—

1. The combination, with the slotted arm A, having the fixed sleeve B at one side thereof, of the adjustable clamp having its head provided with a passage coinciding with the bore of said sleeve, the rod G, adjustable in said sleeve and clamp-head, and the slotted arm A', having the clamp-stud through its slot, and arranged to be secured in position by the clamp, substantially as and for the purpose set forth.

2. The combination, with the slotted arms A and A', of the clamp comprised of the head C, stud $d$, loose clamping-plate E, and the clamping-lever F, having its head pivoted eccentrically to the stud, substantially in the manner and for the purpose set forth.

In testimony that I claim the foregoing I have hereunto set my hand this 2d day of August, 1882.

CARL JOHNSEN.

Witnesses:
 JOHN RIEGETS,
 E. JEBES,
  *Both of Christiania.*